(12) United States Patent
Guha et al.

(10) Patent No.: US 12,001,174 B2
(45) Date of Patent: Jun. 4, 2024

(54) DETERMINATION OF TASK AUTOMATION USING AN ARTIFICIAL INTELLIGENCE MODEL

(71) Applicant: Accenture Global Solutions Limited, Dublin (IE)

(72) Inventors: Tanushree Guha, West Bengal (IN); Rahul Bajaj, Delhi (IN); Kanika Pant, Delhi (IN); Michael Bazigos, New York, NY (US); Vikas Kumar, Gurugram (IN)

(73) Assignee: Accenture Global Solutions Limited, Dublin (IE)

( * ) Notice: Subject to any disclaimer, the term of this patent is extended or adjusted under 35 U.S.C. 154(b) by 967 days.

(21) Appl. No.: 16/947,194

(22) Filed: Jul. 22, 2020

(65) Prior Publication Data
US 2022/0026862 A1    Jan. 27, 2022

(51) Int. Cl.
*G05B 13/02* (2006.01)
*G06N 20/00* (2019.01)
*G06N 7/02* (2006.01)

(52) U.S. Cl.
CPC ......... *G05B 13/0265* (2013.01); *G06N 20/00* (2019.01); *G06N 7/023* (2013.01)

(58) Field of Classification Search
None
See application file for complete search history.

(56) References Cited

U.S. PATENT DOCUMENTS

| 10,067,760 B2 * | 9/2018 | Ryali .................. G06F 16/3347 |
| 10,437,233 B2 | 10/2019 | Goyal et al. |
| 2019/0303836 A1 | 10/2019 | Goyal et al. |
| 2019/0347586 A1 | 11/2019 | Kaulgud et al. |
| 2020/0073639 A1 | 3/2020 | Prasad et al. |
| 2020/0160252 A1 | 5/2020 | Sahni et al. |
| 2021/0319404 A1 | 10/2021 | Lee |

FOREIGN PATENT DOCUMENTS

| CN | 110766269 A | 2/2020 |
| WO | 2020060181 A2 | 3/2020 |

* cited by examiner

*Primary Examiner* — Alan Chen
(74) *Attorney, Agent, or Firm* — Harrity & Harrity, LLP (57) ABSTRACT

A device may process, using a first model and based on an entity-specific task description that is included in entity role data and that is associated with a role, the entity role data to identify a task associated with the role. The device may determine, using a second model and based on the entity-specific task description and standardized descriptions of automation-capable tasks, a task automation score associated with the task. The device may determine, using a third model and based on a characteristic of the task and mappings of standardized characteristics to a plurality of automation categories, a set of automation category scores for the task. The device may classify, based on the set of automation category scores, the task as being associated with a particular automation category, and may perform an action associated with the task automation score and the particular automation category.

20 Claims, 7 Drawing Sheets

DETERMINATION OF TASK AUTOMATION USING AN ARTIFICIAL INTELLIGENCE MODEL

BACKGROUND

Automation can include the use of various control systems for operating equipment, performing tasks, operating vehicles, and/or the like, with minimal or no human intervention. Automation is achieved by various devices, such as mechanical devices, hydraulic devices, pneumatic devices, electrical devices, electronic devices, computing devices, and/or the like. Complicated systems, such as modern factories, airplanes, ships, and/or the like, typically use such devices. Automation conserves labor, energy, materials, and/or the like, and improves quality, accuracy, precision, and/or the like.

SUMMARY

According to some implementations, a method may include receiving, by a device, entity role data that is associated with a role of an entity; processing, by the device and using a first model, the entity role data to identify a task associated with the role, wherein the first model is configured to identify the task based on an entity-specific task description that is included in the entity role data and that is associated with the role; determining, by the device and using a second model, a task automation score associated with the task, wherein the second model is configured to determine the task automation score based on the entity-specific task description and standardized task descriptions of automation-capable tasks; determining, by the device and using a third model, a set of automation category scores for the task, wherein the third model is configured to determine the set of automation category scores based on a characteristic of the task and standardized characteristics that are mapped to a plurality of automation categories; classifying, by the device and based on the set of automation category scores, the task as being associated with an automation category of the plurality of automation categories; and performing, by the device, an action associated with the task automation score and the automation category.

According to some implementations, a device may include one or more memories and one or more processors. In some implementations, the one or more processors are communicatively coupled to the one or more memories. The one or more processors may be configured to: process, using a machine learning model, entity role data to identify a task associated with a role of an entity, wherein the entity role data is specific to the entity; determine, using the machine learning model, a task automation score associated with the task, wherein the task automation score is associated with a probability that the task is capable of being automated; determine, using the machine learning model, a set of automation category scores for the task, wherein the machine learning model is trained based on standardized data that is associated with standardized role descriptions of standardized roles, standardized task descriptions of standardized tasks, and standardized automation category descriptions of standardized automation-capable tasks; classify, based on the set of automation category scores, the task as being associated with an automation category of a plurality of automation categories that are associated with the standardized automation-capable tasks; and perform an action associated with the task automation score and the automation category.

According to some implementations, a non-transitory computer-readable medium may store one or more instructions. The one or more instructions, when executed by one or more processors of a device, may cause the one or more processors to: receive entity data that is associated with a role of an entity; process, using an automation analysis model, the entity data to determine task automation information that is associated with tasks of the role, wherein the automation analysis model is configured to determine the task automation information based on an entity-specific task description of the role in the entity data, standardized role descriptions that are associated with standardized roles, and standardized task automation descriptions that are associated with standardized automation-capable tasks; process, using an adaptive workforce model, the entity data to determine adaptive workforce information that is associated with resources of the entity, wherein the adaptive workforce model is configured to determine the adaptive workforce information based on entity resource information in the entity data, the task automation information, and standardized workforce descriptions associated with standardized workforce types; process, using a skills analysis model, the entity data to determine a skills recommendation associated with one or more of the tasks, wherein the skills analysis model is configured to determine the skills recommendations based on entity skills information in the entity data, the task automation information, and standardized skill descriptions associated with the standardized role descriptions; and perform an action associated with the task automation information, the adaptive workforce information, or the skills recommendation.

DETAILED DESCRIPTION

The following detailed description of example implementations refers to the accompanying drawings. The same reference numbers in different drawings may identify the same or similar elements.

An entity (e.g., a business, an organization, and/or the like) is usually associated with a set of roles and personnel that perform tasks associated with the set of roles. For example, a business might have senior leadership officers, managers, directors, engineers, developers, marketing specialists, and/or the like. Different roles might be associated with different tasks. As an example, a chief legal officer might be responsible for performing particular tasks, whereas an engineer might be responsible for performing other tasks. In many cases, one or more tasks associated with a role may be suitable for automation, but the entity and/or personnel do not have the resources and/or expertise to identify and implement automation of the one or more tasks. This can lead to a waste of computing resources (e.g., processing resources, memory resources, power resources, and/or the like) of computing devices that are used by personnel to perform the one or more tasks.

Some implementations described herein provide a workforce analysis system that uses one or more models (e.g., one or more artificial intelligence models) to identify a task associated with a role, a task automation score associated with the task (e.g., that indicates a probability that the task is an automation-capable task), and an automation category associated with the task (e.g., that indicates a type of automation activity associated with the task) to create task automation information. The workforce analysis system may perform one or more actions based on the task automation information, such as provide a notification (e.g., to a management device) indicating that the task is an automation-capable task, to allow the task to be automated.

In this way, the workforce analysis system may facilitate determination of task automation information. Moreover, the workforce analysis system may enable (e.g., based on the task automation information) a task to be automated, which prevents a waste of computing resources (e.g., processing resources, memory resources, power resources, and/or the like) associated with computing devices that would otherwise be used by personnel to perform the task.

Figure 1A:
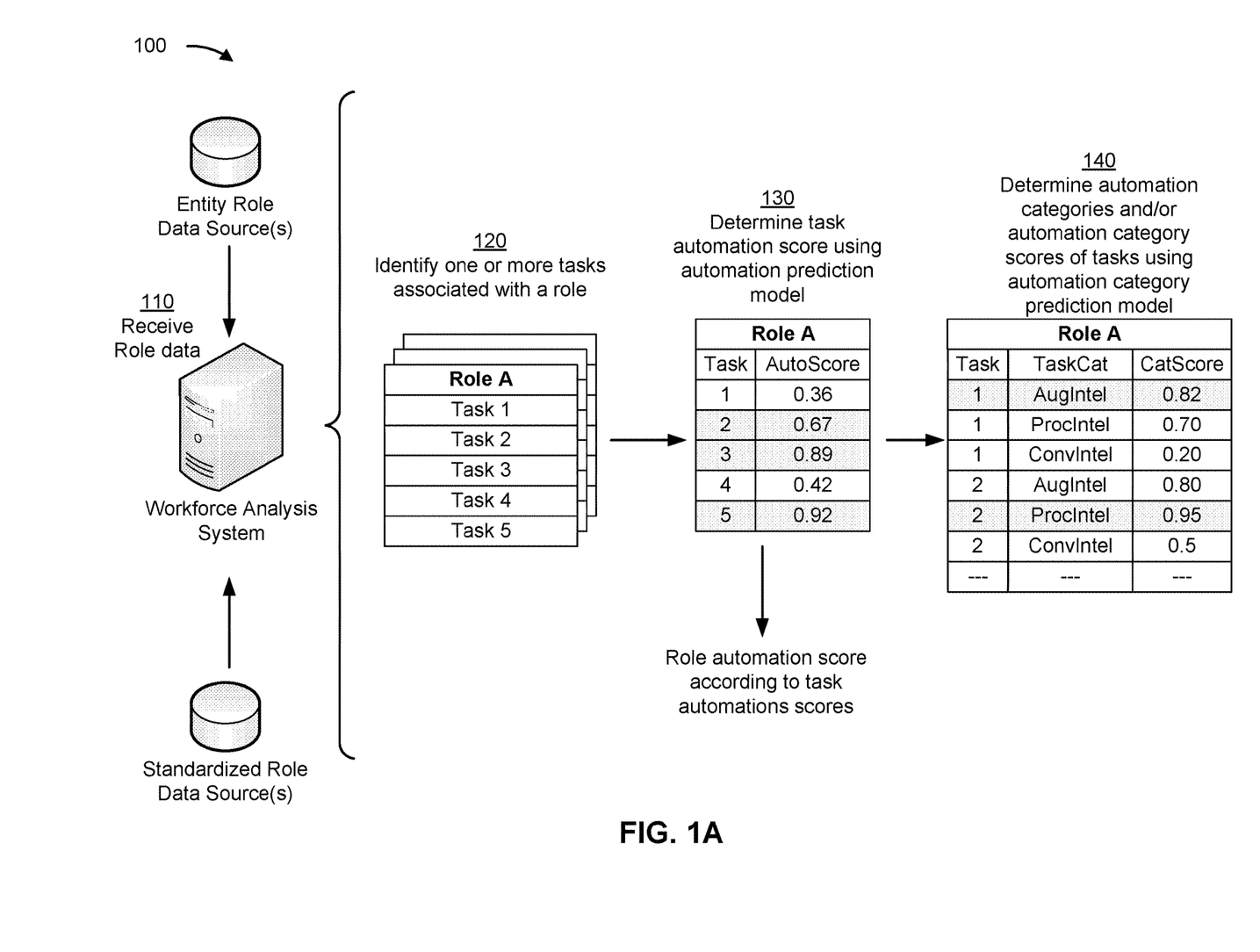
FIGS. 1A-1B are diagrams of an example implementation described herein.
Figure 1B:
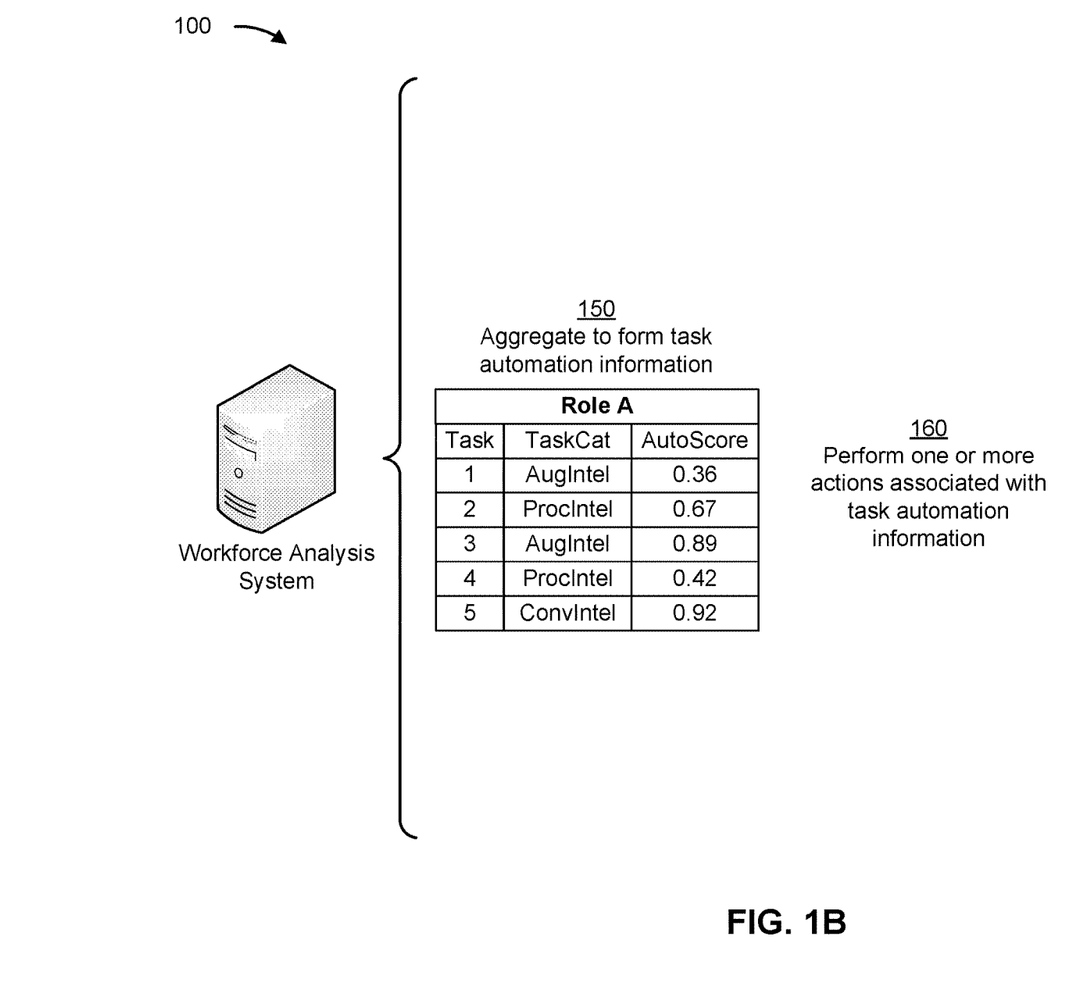

FIGS. 1A-1B are diagrams of an example 100 associated with determining task automation using an artificial intelligence model. As shown in FIGS. 1A-1B, example 100 includes one or more entity role data sources, one or more standardized role data sources, and a workforce analysis system. In example 100, an operator associated with an entity requests identification of particular roles associated with the entity that might benefit from the usage of automation technology, such as hardware, firmware, software, and/or a combination thereof that permits automation of particular tasks.

As shown in FIG. 1A, and by reference number 110, the workforce analysis system may receive role data. For example, the workforce analysis system may receive entity role data from the one or more entity role data sources. The entity role data may be associated with a role of an entity. In some implementations, the entity role data may include one or more entity-specific task descriptions (e.g., text descriptions) that are associated with the role. As used herein, a task description that is specific to the role at the entity may be referred to as an entity-specific task description. For example, the entity role data may be associated with a financial manager role of a particular business and the entity role data may include one or more task descriptions associated with the financial manager role at the particular business.

As another example, the workforce analysis system may receive standardized role data from the one or more standardized role data sources. The standardized role data may be associated with standardized roles (e.g., standardized roles that are associated with any number of entities). In some implementations, the standardized role data may include standardized role descriptions of the standardized roles; a set of standardized task descriptions of standardized tasks associated with each standardized role; a standardized automation category description associated with each standardized task; and/or the like. In some implementations, a standardized task included in the standardized role data may be designated as an automation-capable task. As used herein, a task that is capable of being performed using automation technology, capable of being assisted using automation technology, and/or the like, may be referred to as an automation-capable task.

As further shown in FIG. 1A, and by reference number 120, the workforce analysis system may process the entity role data to identify one or more tasks associated with the role. For example, as shown in FIG. 1A, the workforce analysis system may process the entity role data associated with a Role A to identify one or more tasks (shown as Task 1 through Task 5) associated with the role. In some implementations, the workforce analysis system may identify the one or more tasks by processing the one or more entity-specific task descriptions (e.g., that are associated with the role) that are included in the entity role data. For example, the workforce analysis system may process the one or more entity-specific task descriptions using a natural language processing (NLP) technique to identify a task associated with an entity-specific task description.

In some implementations (e.g., when the entity role data does not include one or more entity-specific task descriptions), the workforce analysis system may identify the one or more tasks associated with the role using a role matching model. For example, the workforce analysis system may process the entity role data to identify the role and may use a role matching model to match the role to a standardized role included in the standardized role data. Accordingly, the workforce analysis system may process the standardized role data to identify one or more tasks associated with the standardized role. In some implementations, the workforce analysis system may identify the one or more tasks by processing the set of standardized task descriptions of standardized tasks associated with the standardized role that is included in the standardized role data. For example, the workforce analysis system may process the set of standardized task descriptions using a natural language processing (NLP) technique to identify a task associated with a standardized task description.

In some implementations, the role matching model may comprise a machine learning model (e.g., an NLP machine learning model, a neural network machine learning model, and/or the like) that has been trained based on the standardized role data. For example, the role matching model may be trained based on the standardized role data that includes standardized role descriptions associated with a plurality of standardized roles. Using the standardized role data as input to the machine learning model, the machine learning model may be trained to identify one or more relationships for identifying role descriptions associated with a role.

As further shown in FIG. 1A, and by reference number 130, the workforce analysis system may determine a task automation score associated with each task of the one or more tasks associated with the role. For example, as shown in FIG. 1A, the workforce analysis system may determine a task automation score associated with each task (shown as 0.36 for Task 1, 0.67 for Task 2, and so on) associated with Role A. The task automation score may be associated with a probability that the task is an automation-capable task. For example, the 0.36 task automation score for Task 1 may be associated with a 36% probability that Task 1 is an automation-capable task, the 0.67 task automation score for Task 2 may be associated with a 67% probability that Task 2 is an automation-capable task, and/or the like.

In some implementations, the workforce analysis system may determine a task automation score associated with a task using an automation prediction model. In some implementations, the workforce analysis system may process, using the automation prediction model, the entity-specific task description (e.g., that is associated with the task and the role) that is included in the entity role data to determine a task automation score associated with the task. Alternatively (e.g., when the entity role data does not include an entity-specific task description), the workforce analysis system may process, using the automation prediction model, the standardized task description (e.g., that is associated with the task and the role) that is included in the standardized role data to determine a task automation score associated with the task.

In some implementations, the automation prediction model may comprise a machine learning model (e.g., an NLP machine learning model, a neural network machine learning model, and/or the like) that has been trained based on the standardized role data. For example, the automation prediction model may be trained based on the standardized role data that includes standardized task descriptions of standardized tasks (e.g., that are automation-capable standardized tasks). Using the standardized role data as input to the machine learning model, the machine learning model may be trained to identify one or more relationships for determining the task automation score associated with the task.

In an example, using an automation prediction model that comprises a neural network machine learning model, the workforce analysis system may process an entity-specific task description associated with a task to generate (e.g., using a word embedding technique) one or more vectors associated with the task (e.g., where each word of the entity-specific task description is represented by a numeric vector representing the meaning of the word). The workforce analysis system may reduce a dimensionality of the one or more vectors (e.g., using a principal component analysis) and may combine the one or more vectors (e.g., using element-wise summation) to produce a representative vector associated with the task. The workforce analysis system may process the representative vector using one or more layers (e.g., one or more dense layers, one or more convolutional layers, and/or the like) to generate a result, and may classify the result (e.g., using a sigmoid classification function) to determine the task automation score associated with the task.

In some implementations, as shown in FIG. 1A, the workforce analysis system may determine a role automation score associated with a role based on the task automation scores of the one or more tasks that are associated with the role. For example, as shown in FIG. 1A, the workforce analysis system may determine a role automation score associated with Role A based on the task automation scores of Tasks 1 through 5. In some implementations, the role automation score may be an average (e.g., a mean, a median, a weighted average, and/or the like) of the task automation scores of the one or more tasks that are associated with the role.

As further shown in FIG. 1A, and by reference number 140, the workforce analysis system may determine a set of automation categories and a set of automation category scores associated with each task of the one or more tasks associated with the role. For example, as shown in FIG. 1A, the workforce analysis system may classify each task into three categories: augmented human intelligence (shown as AugIntel) for activities relating to perceiving, sensing, acting, and/or the like; intelligent process automation (shown as ProcIntel) for activities relating to knowing, learning, reasoning, planning, and/or the like; and conversational intelligence (shown as ConvIntel) for activities relating to communicating. The workforce analysis system may determine an automation category score for each automation category associated with a task (e.g., shown for Task 1 of Role A as 0.82 for AugIntel, 0.70 for ProcIntel, and 0.20 for ConvIntel). The automation category score may be associated with a probability that the task is correctly associated with an automation category. For example, the 0.82 automation category score that is associated with the AugIntel automation category for Task 1 may indicate an 82% probability that Task 1 is correctly associated with the AugIntel automation category.

In some implementations, the workforce analysis system may determine a set of automation categories and a set of automation category scores associated with a task using an automation category prediction model. In some implementations, the workforce analysis system may process, using the automation category prediction model, an entity-specific task description (e.g., that is associated with a task and a role) that is included in the entity role data to determine a set of automation categories and a set of automation category scores associated with a task.

In some implementations, the automation category prediction model may comprise a machine learning model (e.g., an NLP machine learning model, a neural network machine learning model, and/or the like). The machine learning model may be trained based on sets of keywords associated with one or more automation categories (e.g., descriptive keywords associated with each automation category). In some implementations, the machine learning model may be trained based on standardized role data that includes standardized role descriptions of standardized roles, standardized task descriptions of standardized tasks (e.g., that are automation-capable standardized tasks), and/or standardized automation category descriptions of the standardized tasks. Accordingly, the machine learning model may be trained to identify one or more relationships for determining the set of automation categories and the set of automation category scores associated with the task.

In an example, using an automation category prediction model that comprises an unsupervised text classification machine learning model, the workforce analysis system may process an entity-specific task description associated with a task to generate (e.g., using a word embedding technique) one or more vectors associated with the task (e.g., where each word of the entity-specific task description is represented by a numeric vector representing the meaning of the word). The workforce analysis system may compare the one or more vectors and one or more automation category vectors (e.g., generated by processing standardized role data that includes standardized task descriptions of standardized tasks and/or standardized automation category descriptions of the standardized tasks) to determine a similarity score (e.g., based on a vector similarity) associated with an automation category. The workforce analysis system may determine, based on the similarity score, the automation category score associated with the automation category for the task.

As shown in FIG. 1B, and by reference number 150, the workforce analysis system may aggregate the role, the one or more tasks associated with the role, the task automation score associated with each task of the one or more tasks, and/or the set of automation categories and the set of automation category scores associated with each task of the one or more tasks to form task automation information. The task automation information may indicate, for a role, one or more tasks respectively associated with an automation category and a task automation score. For example, as shown in FIG. 1B, the task automation information may indicate, for Role A, Tasks 1 through 5, where Task 1 is associated with the AugIntel automation category and a task automation score of 0.36, Task 2 is associated with the ProcIntel automation category and task automation score 0.67, and so on.

In some implementations, the workforce analysis system may select, for a particular task of the one or more tasks associated with the role, an automation category that is associated with the highest automation category score for the particular task (e.g., that indicates that the particular task is most similar to the selected automation category of the set of automation categories). Accordingly, the workforce analysis system may cause, as part of the aggregation process to form the task automation information, the selected automation category to be included in the task automation information for the particular task (and no other automation category for the particular task). For example, the workforce analysis system may cause the task automation information to indicate, for a role associated with the particular task, the role, the particular task, the task automation score associated with the particular task, and the selected automation category.

As further shown in FIG. 1B, and by reference number 160, the workforce analysis system may perform one or more actions associated with the task automation information. In some implementations, the one or more actions may include providing some or all of the task automation information to another device, such as a management device (e.g., a user device of a manager of the workforce analysis system). For example, the workforce analysis system may provide the task automation score and the automation category associated with a particular task and a particular role to the other device. In some implementations, the workforce analysis system may cause a display of a user interface (e.g., on a display of the other device) to present some or all of the task automation information (e.g., the task automation score and the automation category associated with the particular task and the particular role).

In some implementations, performing the one or more actions includes determining that the task automation score satisfies (e.g., is greater than or equal to) a threshold that indicates that the particular task is an automation-capable task. Accordingly, the workforce analysis system may provide a notification (e.g., to the other device) indicating that the particular task is an automation-capable task that is associated with the automation category.

In this way, the workforce analysis system may facilitate identification of automation-capable tasks. This may allow the automation-capable tasks to be automated, which may conserve computing resources (e.g., processing resources, memory resources, power resources, and/or the like) of computing devices of personnel that would otherwise be used to assist the personnel in performing the automation-capable tasks.

In some implementations, the one or more actions include determining that the task automation score is one of a set of task automation scores that are associated with a plurality of tasks of the role and that satisfy the threshold. The workforce analysis system may determine, based on a quantity of the set of task automation scores and a quantity of the plurality of tasks, a probability that the role is automatable and provide, to the other device, the probability that the role is automatable in association with the set of task automation scores. For example, the workforce analysis system may determine that the probability that the role is automatable based on a ratio of the quantity of the set of task automation scores and the quantity of the plurality of tasks. Additionally, or alternatively, the workforce analysis system may determine that the probability that the role is automatable based on respective weight values associated with the plurality of tasks (e.g., where a weight value associated with a task indicates a representative amount of time needed to perform the task for the role).

In this way, the workforce analysis system may facilitate identification of automation-capable roles. This may allow for entire roles to be automated, which may conserve computing resources (e.g., processing resources, memory resources, power resources, and/or the like) of computing devices of personnel that would otherwise be used to assist the personnel in performing the roles.

In some implementations, the one or more actions include utilizing an adaptive workforce module, as described below with respect to FIGS. 2A-2B, and/or a skills analysis module, as described below with respect to FIG. 3, of the workforce analysis system.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2A:
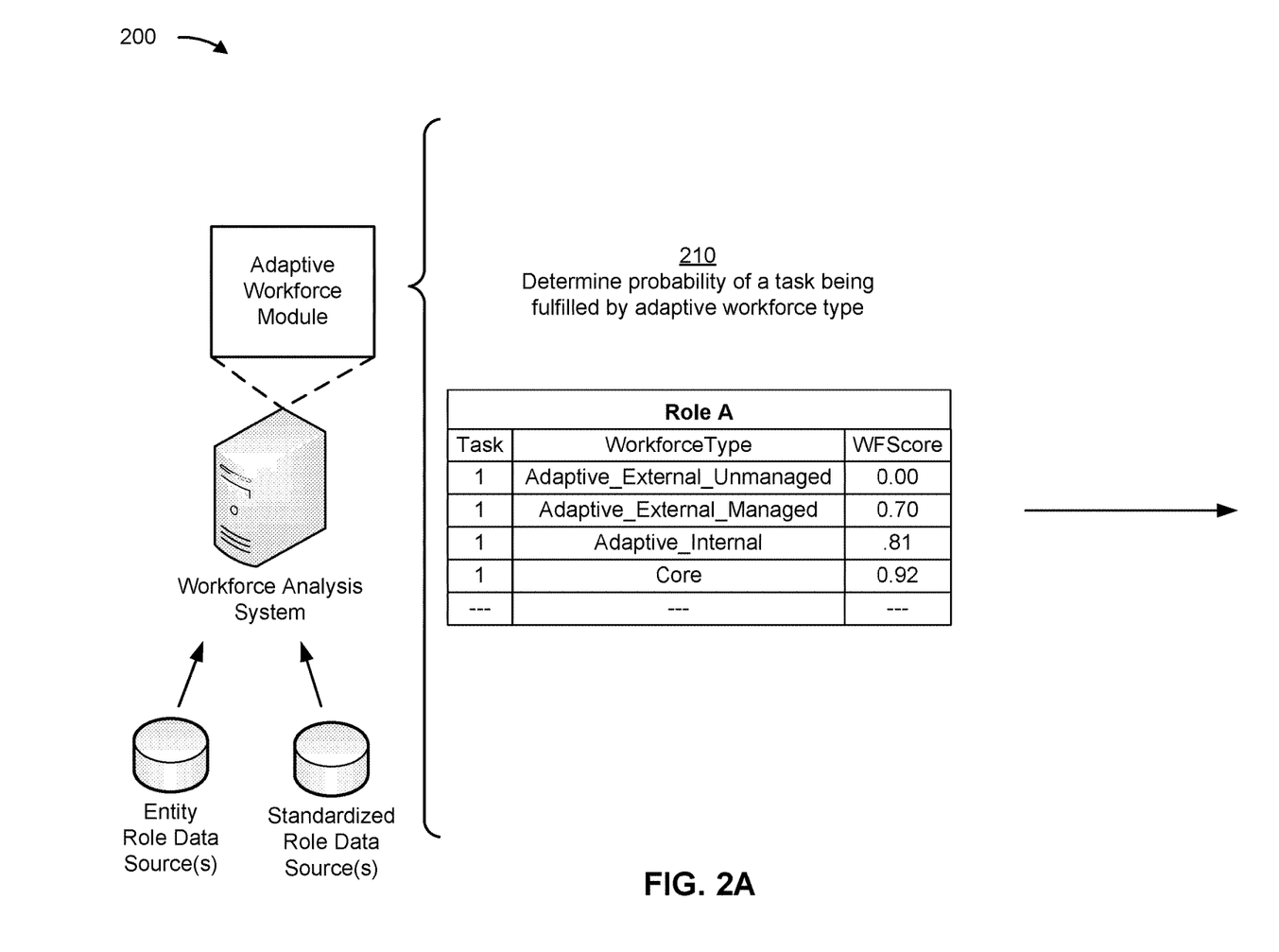
FIGS. 2A-2B are diagrams of an example implementation related to utilizing an adaptive workforce module of a workforce analysis system described herein.
Figure 2B:
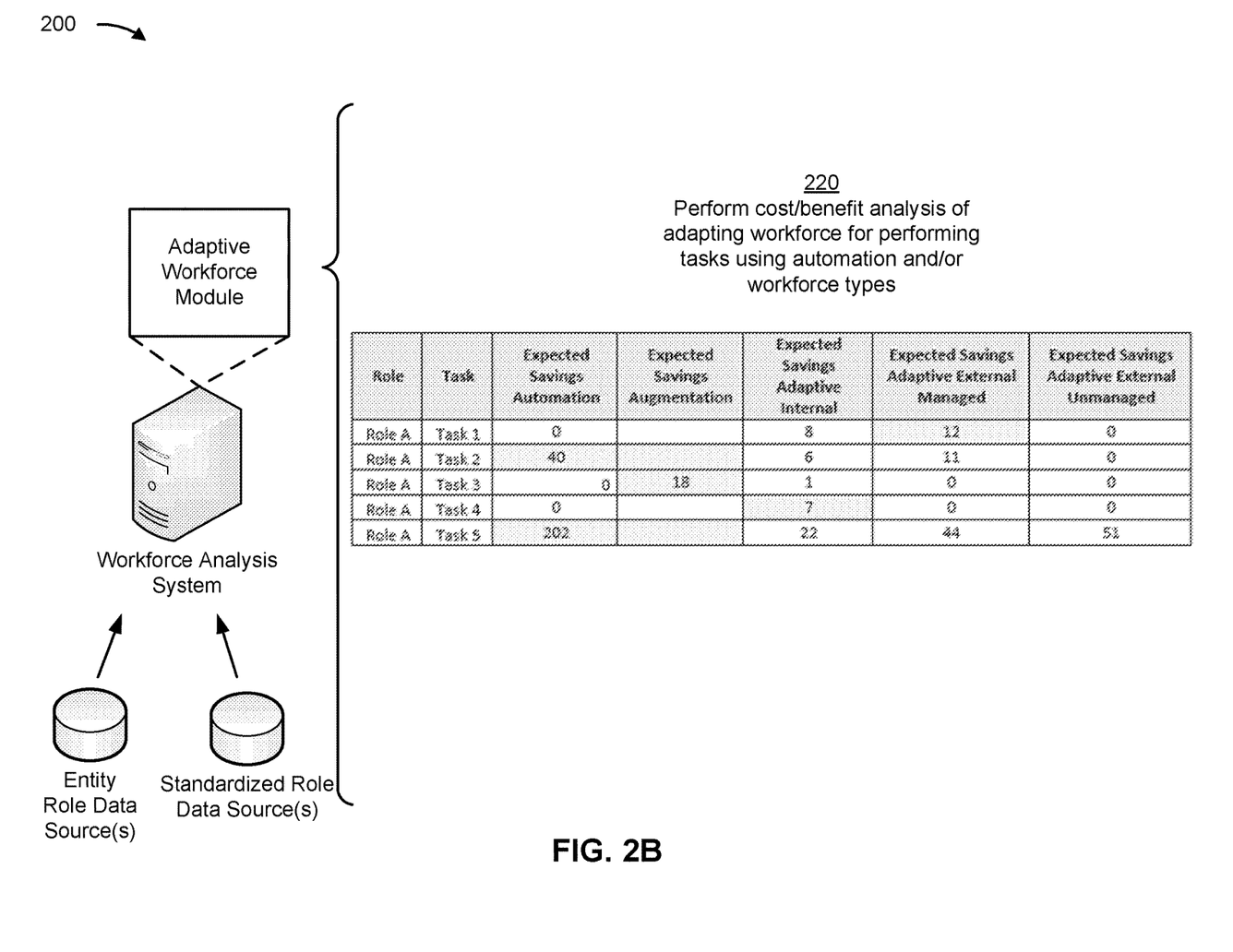

FIGS. 2A-2B are diagrams of an example 200 associated with utilizing an adaptive workforce module of the workforce analysis system described herein. The workforce analysis system may use the adaptive workforce module to identify opportunities for using internal talent pools and external talent pools for performing tasks associated with a role. The workforce analysis system may use the adaptive workforce module to perform any or all of the processing steps described herein in association with FIGS. 2A-2B. As shown in FIGS. 2A-2B, example 200 includes the one or more entity role data sources, the one or more standardized role data sources, and the workforce analysis system.

In some implementations, the workforce analysis system may obtain entity resource information associated with an entity (e.g., the entity described above in relation to FIGS. 1A-1B). For example, the workforce analysis system may receive the entity resource information from the one or more entity role data sources. In some implementations, the entity resource information may be included in the entity role data received by the workforce analysis system (e.g., as described above in relation to FIG. 1A).

In some implementations, the entity resource information may be associated with talent pools of the entity (e.g., to perform specific tasks). For example, the entity resource information may identify one or more workforce types that are available to the entity to perform an associated task (e.g., a task identified in the task automation information that is formed by the workforce analysis system as described above in relation to FIGS. 1A-1B). A workforce type may indicate whether the associated task can be performed by an internal workforce and/or an external workforce. For example, as shown in FIG. 2A, a workforce type of Adaptive_External_Unmanaged may indicate that the associated task can be performed by an unmanaged external workforce (e.g., a publicly available external workforce with or without professional qualifications or specific experience relating to the associated task, such as freelancers, crowd workers, and/or the like), a workforce type of Adaptive_External_Managed may indicate that the associated task can be performed by a managed external workforce (e.g., secured and qualified external talent, such as independent contractors), a workforce type of Adaptive_Internal may indicate that the associated task can be performed by an internal workforce (e.g., internal employees that act as an on-demand workforce and may additionally fill a continuous role, such as expert pools, personnel currently between projects, and/or the like), a workforce type of Core may indicate that the associated task can be performed by a core internal workforce (e.g., internal employees who work permanently within a specific role and assume no additional responsibilities), and/or the like.

As shown in FIG. 2A, and by reference number 210, the workforce analysis system may determine a workforce type score associated with each workforce type available to a task associated with a role. For example, as shown in FIG. 2A, the workforce analysis system may determine a workforce type score associated with each workforce type (shown as 0.00 for Adaptive_External_Unmanaged, 0.70 for Adaptive_ External_Managed, and so on) associated with Task 1 of Role A. The workforce type score may be associated with a probability that the task can be fulfilled by an associated workforce type (e.g., in particular, an adaptive workforce type). For example, the 0.00 workforce type score for Adaptive_External_Unmanaged may be associated with a 0% probability that Task 1 may be fulfilled by the Adaptive_External_Unmanaged workforce type, the 0.70 workforce type score for Adaptive_External_Managed may be associated with a 70% probability that Task 1 may be fulfilled by the Adaptive_External_Unmanaged workforce type, and/or the like.

In some implementations, the workforce analysis system may determine a workforce type score associated with a workforce type of a task using an adaptive workforce model. In some implementations, the workforce analysis system may process, using the adaptive workforce model, the task automation information and the entity resource information to determine a workforce type score associated with the workforce type of the task.

In some implementations, the adaptive workforce model may comprise a machine learning model (e.g., an NLP machine learning model, a neural network machine learning model, and/or the like) that has been trained based on the standardized role data. For example, the adaptive workforce model may be trained based on the standardized role data that includes standardized workforce type descriptions of standardized workforce types that are associated with standardized tasks. Using the standardized role data as input to the machine learning model, the machine learning model may be trained to identify one or more relationships for determining the workforce type score associated with the workforce type of the task.

In an example, using an adaptive workforce model that comprises a neural network machine learning model, the workforce analysis system may process an entity-specific task description associated with a task to generate (e.g., using a word embedding technique) one or more vectors associated with the task (e.g., where each word of the entity-specific task description is represented by a numeric vector representing the meaning of the word). The workforce analysis system may reduce a dimensionality of the one or more vectors (e.g., using a principal component analysis). The workforce analysis system may process the one or more vectors using one or more layers (e.g., one or more dense layers, one or more convolutional layers, one or more recurrent layers, one or more fully connected layers, and/or the like) to produce a workforce type score associated with a workforce type of the task.

In some implementations, the workforce analysis system, for a particular task of the one or more tasks associated with the role, may select a workforce type that is associated with the highest workforce type score for the particular task (e.g., that indicates that the particular task is most likely to be associated with the selected workforce type of the one or more workforce types). Accordingly, the workforce analysis system may cause the selected workforce type to be included in the task automation information for the particular task (and no other workforce type for the particular task). For example, the workforce analysis system may cause the task automation information to indicate, for a role associated with the particular task, the role, the particular task, a task automation score associated with the particular task, an automation category associated with the particular task, and the selected workforce type.

In some implementations, workforce analysis system, when the selected workforce type is Adaptive_External_Unmanaged, may identify a workforce subtype. A workforce subtype may indicate what type of unmanaged external workforce can perform the associated task. For example, the workforce subtype may indicate whether a task can be performed by a public crowd, creative freelancers, technical freelancers, participants in an innovation challenge, and/or the like. In some implementations, the workforce analysis system may use an unsupervised text classification model to determine the workforce subtype. For example, the workforce analysis system may identify a set of words associated with the task and a set of words associated with each potential workforce subtype. The workforce analysis system may convert each set of words to respective word embedding vectors, and may determine a word embedding vector associated with a particular workforce subtype that is most similar to the word embedding vector associated with the task. The workforce analysis system may select the particular workforce subtype as the workforce subtype associated with the task.

As shown in FIG. 2B, and by reference number 220, the workforce analysis system may perform a cost/benefit analysis of adapting a workforce for performing tasks using automation and/or the one or more workforce types. In some implementations, the workforce analysis system may process the task automation information (e.g., after updating the task automation information to indicate a workforce type for a task) to identify expected savings associated with automating and/or using particular workforce types for a task associated with a role. For example, as shown in FIG. 2B, for Task 1 of Role A, the expected savings associated with using an Adaptive Internal workforce type is 8 (e.g., $8 expected savings every time Task 1 of Role A is performed) and the expected savings associated with an Adaptive External Managed workforce type is 12 (e.g., $12 expected savings); for Task 2 of Role A, the expected savings associated with using automation is 40 (e.g., $40 expected savings), the expected savings associated with using an Adaptive Internal workforce type is 6 (e.g., $6 expected savings), and the expected savings associated with an Adaptive External Managed workforce type is 11 (e.g., $11 expected savings); and so on. The workforce analysis system may use an algorithm (e.g., based on one or more weightings) to determine the expected savings values.

Accordingly, the workforce analysis system may provide the cost/benefit analysis to another device, such as a management device (e.g., a user device of a manager of the workforce analysis system). Additionally, or alternatively, the workforce analysis system may generate, based on the cost/benefit analysis, a recommended workforce mix associated with a role. The optimal workforce mix may indicate how many and/or how much of the tasks of the role should be automated and/or performed by a particular workforce type. The workforce analysis system may provide the recommended workforce mix to the other device, which may allow one or more tasks associated with a role to be automated.

As indicated above, FIGS. 2A-2B are provided as an example. Other examples may differ from what is described with regard to FIGS. 2A-2B. The number and arrangement of devices shown in FIGS. 2A-2B are provided as an example. In practice, there may be additional devices, fewer devices, different devices, or differently arranged devices than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) shown in FIGS. 2A-2B may perform one or more functions described as being performed by another set of devices shown in FIGS. 2A-2B.

Figure 3:
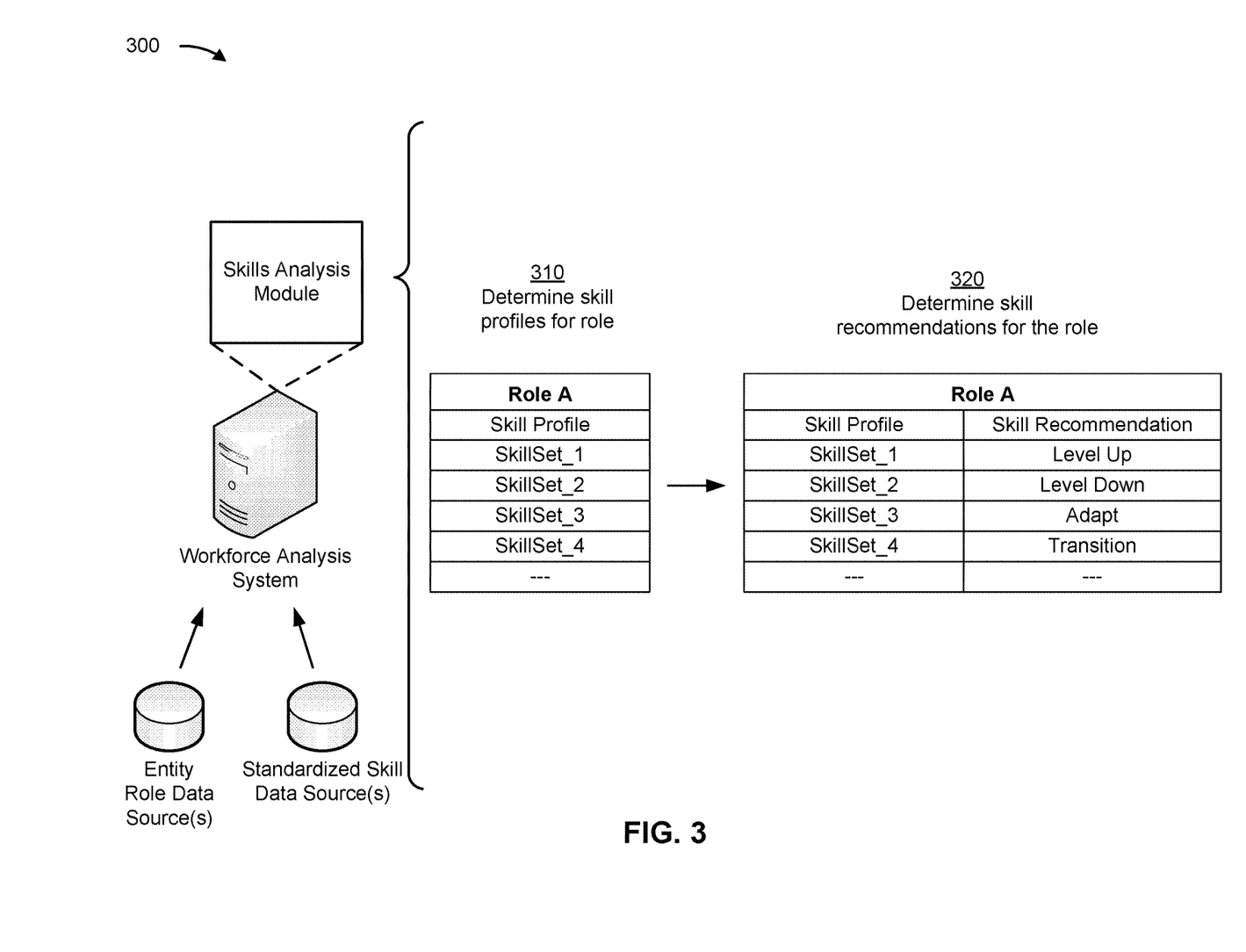
FIG. 3 is a diagram of an example implementation related to utilizing a skills analysis module of a workforce analysis system described herein.

FIG. 3 is a diagram of an example 300 associated with utilizing a skills analysis module of the workforce analysis system described herein. The workforce analysis system may use the skills analysis module to identify skill recommendations for a role. The workforce analysis system may use the skills analysis module to perform any or all of the processing steps described herein in association with FIG. 3. As shown in FIG. 3, example 300 includes the one or more entity role data sources, one or more standardized skill data sources, and the workforce analysis system.

As shown in FIG. 3, the workforce analysis system may obtain skill information that is associated with a role (e.g., the role described above in relation to FIGS. 1A-1B). For example, the workforce analysis system may receive the skill information from the one or more standardized skill data sources. The skill information may indicate skills that are available to the entity, well-known skills that are in demand (e.g., internally and externally), skill trends (e.g., changes in demand for particular skills), and/or the like.

As shown in FIG. 3, and by reference number 310, the workforce analysis system may determine a skill profile for a role (e.g., the role described above in relation to FIGS. 1A-1B). For example, as shown in FIG. 3, the workforce analysis system may determine a skill profile (shown as SkillSet_1, SkillSet_2, and so on) associated with Role A. A skill profile may indicate one or more particular skills needed to perform the role. A skill may be an individual activity that is performed to complete a task associated with the role. A skill level associated with the skill may indicate an amount of time and/or experience associated with the skill.

In some implementations, the workforce analysis system may process the task automation information, the entity role data, and/or the standardized role data (e.g., that is described above in relation to FIGS. 1A-1B) to determine one or more skill profiles for a role. In some implementations, the workforce analysis system may identify the one or more skill profiles associated with the role using a skill matching model. For example, the workforce analysis system may process the entity role data to identify the role and may use a skill matching model to match the role to a standardized role included in the standardized role data. Accordingly, the workforce analysis system may process the standardized role data to identify one or more standardized skill profiles associated with the standardized role.

As further shown in FIG. 3, and by reference number 320, the workforce analysis system may determine a skill recommendation for each skill profile associated with a role. For example, as shown in FIG. 3, the workforce analysis system may determine a skill recommendation (shown as Level Up, Level Down, and so on) for each skill profile (shown as SkillSet_1, SkillSet_2, and so on) of Role A. The skill recommendation may indicate whether a skill set profile should be modified. For example, the Level Up skill recommendation may indicate that a skill set profile should be increased (e.g., by requiring additional skills, a higher skill level for some skills associated with the skill set profile, and/or the like); the Level Down skill recommendation may indicate that the skill set profile should be decreased (e.g., by requiring some skills associated with the skill set profile to be removed, a lower skill level for some skills associated with the skill set profile, and/or the like); an Adapt skill recommendation may indicate that some skills associated with the skill set profile should be adapted or modified (e.g., adapt a typing skill to a dictating skill); a Transition skill recommendation may indicate that some skills associated with the skill set profile should be moved to another task and/or another role (e.g., a role subordinate to the role); and/or the like.

In some implementations, the workforce analysis system may determine a skill recommendation using a skills analysis model. In some implementations, the workforce analysis system may process, using the skills analysis model, the skill information and a skill profile associated to determine the skill recommendation for the task.

In some implementations, the skills analysis model may comprise a machine learning model (e.g., an NLP machine learning model, a neural network machine learning model, and/or the like) that has been trained based on standardized skill data (e.g., that may be included in the skill information). For example, the skills analysis model may be trained based on standardized skill data that includes standardized skill descriptions of standardized skills that are associated with standardized tasks. Using the standardized skill data as input to the machine learning model, the machine learning model may be trained to identify one or more relationships for determining the skill recommendation for the task.

In some implementations, the workforce analysis system may provide the skill recommendation to another device, such as a management device (e.g., a user device of a manager of the workforce analysis system). This may allow an adjustment to be made associated with performance of a task.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
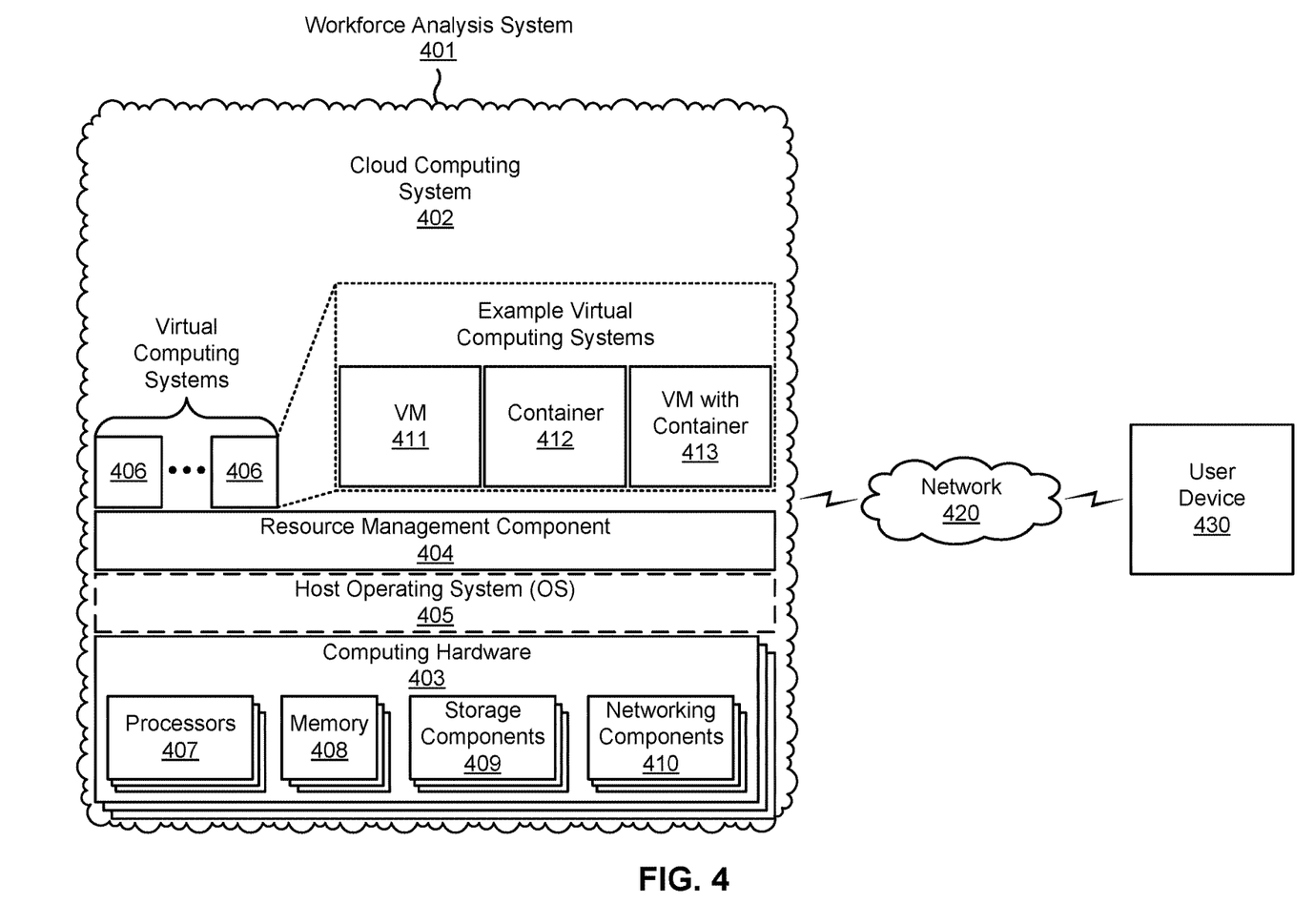
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a workforce analysis system 401, which may include one or more elements of and/or may execute within a cloud computing system 402. The cloud computing system 402 may include one or more elements 403-413, as described in more detail below. As further shown in FIG. 4, environment 400 may include a network 420, and/or a user device 430. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

A processor 407 includes a central processing unit, a graphics processing unit, and/or the like. A memory 408 includes random-access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the workforce analysis system 401 to perform one or more operations or processes described herein. A storage component 409 includes a hard disk or another type of storage device that stores information, data, and/or software (e.g., code, instructions, and/or the like) related to the operation and use of the workforce analysis system 401. In some implementations, memory 408 and/or storage component 409 is/are implemented as a non-transitory computer readable medium. A networking component 410 includes a network interface and corresponding hardware that enables the workforce analysis system 401 to communicate with other devices of environment 400 via a wired connection and/or a wireless connection, such as via network 420.

Although the workforce analysis system 401 may include one or more elements 403-413 of the cloud computing system 402, may execute within the cloud computing system 402, and/or may be hosted within the cloud computing system 403, in some implementations, the workforce analysis system 401 may not be cloud-based (e.g., may be implemented outside of a cloud computing system) or may be partially cloud-based. For example, the workforce analysis system 401 may include one or more devices that are not part of the cloud computing system 402, which may include a standalone server or another type of computing device. The workforce analysis system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

User device 430 includes one or more devices capable of receiving, generating, storing, processing, and/or providing information, as described elsewhere herein. User device 430 may include a communication device and/or a computing device. For example, user device 430 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 430 may communicate with one or more other devices of environment 400, as described elsewhere herein. User device 430 may include one or more processors (e.g., similar to processor 407), one or more memories (e.g., similar to memory 408), one or more storage components (e.g., similar to storage component 409), one or more networking components (e.g., similar to networking component 410), and/or the like.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
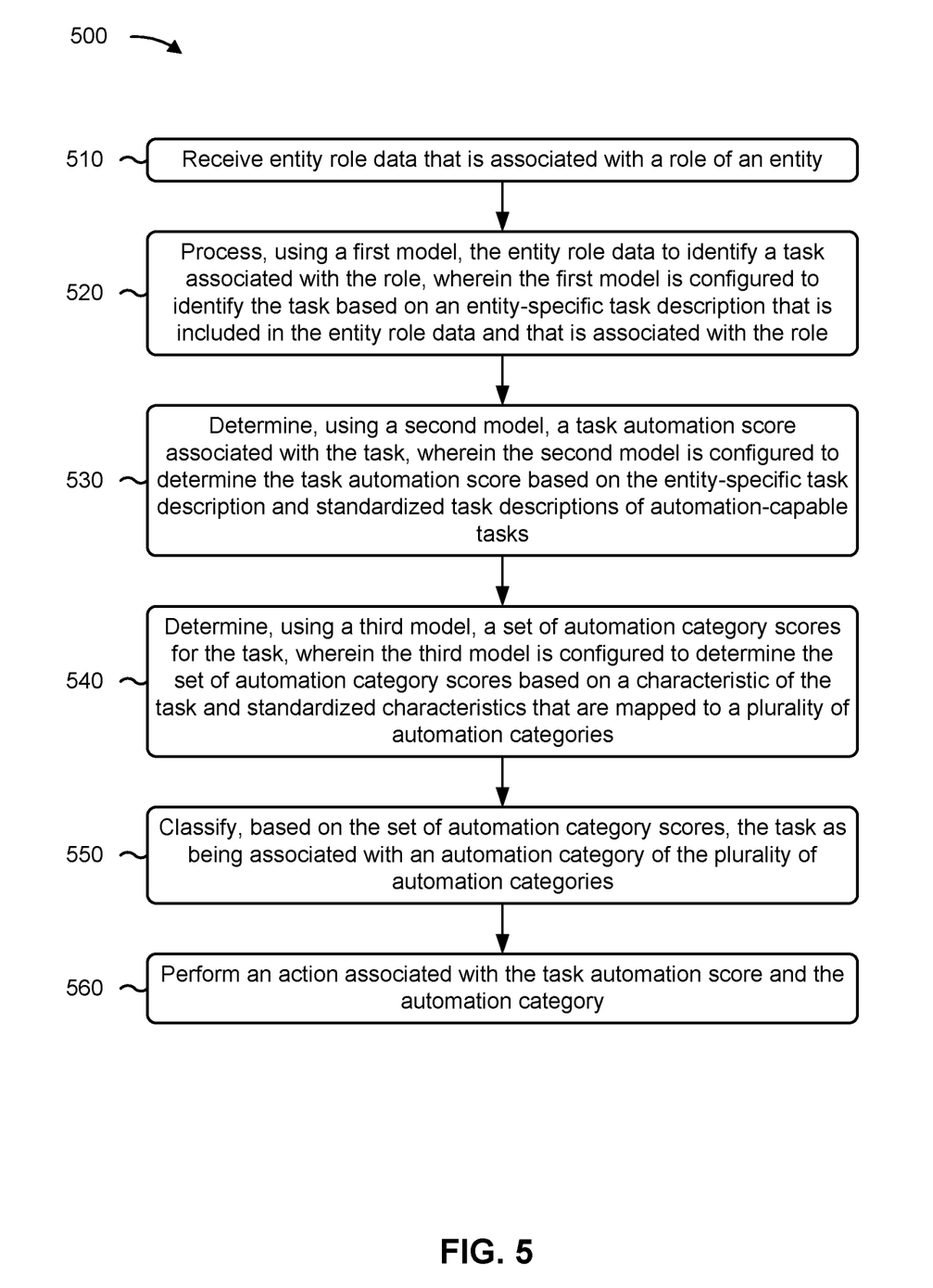
FIG. 5 is a flow chart of example processes relating to determining task automation using an artificial intelligence model.

FIG. 5 is a flow chart of an example process 500 associated with determining task automation using an artificial intelligence model. In some implementations, one or more process blocks of FIG. 5 may be performed by a device (e.g., workforce analysis system 401). In some implementations, one or more process blocks of FIG. 5 may be performed by another device or a group of devices separate from or including the device, such as a user device (e.g., user device 430), and/or the like. Additionally, or alternatively, one or more process blocks of FIG. 5 may be performed by one or more components of a device, such as processor 407, memory 408, storage component 409, networking component 410, and/or the like.

As shown in FIG. 5, process 500 may include receiving entity role data that is associated with a role of an entity (block 510). For example, the device may receive entity role data that is associated with a role of an entity, as described above.

As further shown in FIG. 5, process 500 may include processing, using a first model, the entity role data to identify a task associated with the role, wherein the first model is configured to identify the task based on an entity-specific task description that is included in the entity role data and that is associated with the role (block 520). For example, the device may process, using a first model, the entity role data to identify a task associated with the role, as described above. In some implementations, the first model is configured to identify the task based on an entity-specific task description that is included in the entity role data and that is associated with the role.

As further shown in FIG. 5, process 500 may include determining, using a second model, a task automation score associated with the task, wherein the second model is configured to determine the task automation score based on the entity-specific task description and standardized task descriptions of automation-capable tasks (block 530). For example, the device may determine, using a second model, a task automation score associated with the task, as described above. In some implementations, the second model is configured to determine the task automation score based on the entity-specific task description and standardized task descriptions of automation-capable tasks.

As further shown in FIG. 5, process 500 may include determining, using a third model, a set of automation category scores for the task, wherein the third model is configured to determine the set of automation category scores based on a characteristic of the task and standardized characteristics that are mapped to a plurality of automation categories (block 540). For example, the device may determine, using a third model, a set of automation category scores for the task, as described above. In some implementations, the third model is configured to determine the set of automation category scores based on a characteristic of the task and standardized characteristics that are mapped to a plurality of automation categories.

As further shown in FIG. 5, process 500 may include classifying, based on the set of automation category scores, the task as being associated with an automation category of the plurality of automation categories (block 550). For example, the device may classify, based on the set of automation category scores, the task as being associated with an automation category of the plurality of automation categories, as described above.

As further shown in FIG. 5, process 500 may include performing an action associated with the task automation score and the automation category (block 560). For example, the device may perform an action associated with the task automation score and the automation category, as described above.

In a first implementation, the first model is trained based on standardized role descriptions associated with a plurality of standardized roles and sets of standardized tasks that are associated with the plurality of standardized roles.

In a second implementation, alone or in combination with the first implementation, the second model is trained based on standardized task descriptions associated with a plurality of automation-capable tasks.

In a third implementation, alone or in combination with one or more of the first and second implementations, the third model is trained based on standardized automation category descriptions associated with the automation-capable tasks, and the set of automation category scores correspond to individual probabilities that the task is associated with the plurality of automation categories.

In a fourth implementation, alone or in combination with one or more of the first through third implementations, process 500 includes obtaining entity resource information associated with the entity; identifying, from the entity resource information, a plurality of workforce types that are available to the entity to perform the task; determining, based on the entity resource information and the entity-specific task description, probabilities that the plurality of workforce types are configured to perform the task; and identifying, based on the probabilities, that a first workforce type, of the plurality of workforce types, is likely configured to perform the task, wherein performing the action comprises performing a cost-benefit analysis of performing the task using the first workforce type or a second workforce type that is not associated with a resource of the entity.

In a fifth implementation, alone or in combination with one or more of the first through fourth implementations, process 500 includes determining, based on the entity-specific task description, a skill profile associated with the role, wherein performing the action comprises determining a skill recommendation for the skill profile; and providing, to a management device, the skill recommendation.

In a sixth implementation, alone or in combination with one or more of the first through fifth implementations, performing the action comprises at least one of providing, to a management device, the task automation score and the automation category, or causing a display of a user interface to present the task automation score and the automation category.

In a seventh implementation, alone or in combination with one or more of the first through sixth implementations, the machine learning model comprises a plurality of models that are independently trained based on the standardized role descriptions, the standardized task descriptions, and the standardized automation category descriptions.

In an eighth implementation, alone or in combination with one or more of the first through seventh implementations, process 500 includes determining that the task automation score satisfies a threshold that indicates that the task is an automation-capable task that is associated with the automation category, and performing the action comprises providing a notification that the task is an automation-capable task that is associated with the automation category.

In a ninth implementation, alone or in combination with one or more of the first through eighth implementations, process 500 includes determining that the task automation score is one of a set of task automation scores that are associated with a plurality of tasks of the role and that satisfy the threshold, and performing the action comprises determining, based on a quantity of the set of task automation scores and a quantity of the plurality of tasks, a probability that the role is automatable, and providing, to a management device, the probability that the role is automatable in association with the set of task automation scores.

In a tenth implementation, alone or in combination with one or more of the first through ninth implementations, process 500 includes determining that the task automation score satisfies a threshold that indicates that the task is an automation-capable task that is associated with the automation category; obtaining, based on the task automation score satisfying the threshold, entity resource information associated with the entity; identifying, from the entity resource information, a plurality of workforce types that are available to the entity to perform the task; determining, based on the entity resource information and an entity-specific task description of the task, probabilities that the plurality of workforce types are configured to perform the task; and identifying, based on the probabilities, that a first workforce type, of the plurality of workforce types, is likely configured to perform the task, and performing the action includes performing a cost-benefit analysis of performing the task using the first workforce type or a second workforce type that is associated with the automation-capable task.

In an eleventh implementation, alone or in combination with one or more of the first through tenth implementations, process 500 includes determining a skill profile associated with the role, wherein performing the action includes determining a skill recommendation for the skill profile; and providing, to a management device, the skill recommendation to cause an adjustment associated with performance of the task.

In a twelfth implementation, alone or in combination with one or more of the first through eleventh implementations, performing the action includes providing, to a management device, the task automation score and the automation category, or causing a display of a user interface to present the task automation score and the automation category.

In a thirteenth implementation, alone or in combination with one or more of the first through twelfth implementations, the task automation information identifies at least one of: probabilities that the tasks are automation-capable tasks, a probability that the role can be automated, or automation categories associated with the tasks, and performing the action includes providing the task automation information to a management device.

In a fourteenth implementation, alone or in combination with one or more of the first through thirteenth implementations, the adaptive workforce information identifies at least one of: probabilities that the tasks are being performed by one of the standardized workforce types, or a cost/benefit outcome associated with adapting one or more of the tasks to be automated or performed by an external party, and performing the action includes providing the adaptive workforce information to a management device.

In a fifteenth implementation, alone or in combination with one or more of the first through fourteenth implementations, the skills recommendation identifies, for a task of the one or more tasks, at least one of: a recommendation that a skill set should be adapted, a recommendation that a skill set should be adjusted, or a recommendation that a skill set should be performed by another role that is different than the role, and performing the action includes providing the skills recommendation to a management device.

In a sixteenth implementation, alone or in combination with one or more of the first through fifteenth implementations, the automation analysis model, the adaptive workforce model, and the skills analysis model are associated with a same type of model and are trained based on different sets of standardized data.

In a seventeenth implementation, alone or in combination with one or more of the first through sixteenth implementations, performing the action includes providing, to a management device, the task automation information, the adaptive workforce information, and the skill recommendation, or causing a display of a user interface to present the task automation information, the adaptive workforce information, and the skill recommendation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a device, entity role data that is associated with a role of an entity;
 processing, by the device and using a first model, the entity role data to identify a task associated with the role,
  wherein the first model is configured to identify the task based on an entity-specific task description that is included in the entity role data and that is associated with the role;
 determining, by the device and using a second model, a task automation score associated with the task,
  wherein the second model is configured to determine the task automation score based on the entity-specific task description and standardized task descriptions of automation-capable tasks;
 determining, by the device and using a third model, a set of automation category scores for the task,
  wherein the third model is trained based on standardized automation category descriptions associated with the automation-capable tasks,
  wherein the third model is configured to determine the set of automation category scores based on a characteristic of the task and standardized characteristics that are mapped to a plurality of automation categories, and
  wherein the set of automation category scores correspond to individual probabilities that the task is associated with the plurality of automation categories;
 classifying, by the device and based on the set of automation category scores, the task as being associated with an automation category of the plurality of automation categories; and
 performing, by the device, an action associated with the task automation score and the automation category.

2. The method of claim 1, wherein the first model is trained based on standardized role descriptions associated with a plurality of standardized roles and sets of standardized tasks that are associated with the plurality of standardized roles.

3. The method of claim 1, wherein the second model is trained based on standardized task descriptions associated with the automation-capable tasks.

4. The method of claim 1, further comprising:
 obtaining entity resource information associated with the entity;
 identifying, from the entity resource information, a plurality of workforce types that are available to the entity to perform the task;
 determining, based on the entity resource information and the entity-specific task description, probabilities that the plurality of workforce types are configured to perform the task; and
 identifying, based on the probabilities, that a first workforce type, of the plurality of workforce types, is likely configured to perform the task,
 wherein performing the action comprises:
  performing a cost-benefit analysis of performing the task using the first workforce type or a second workforce type that is not associated with a resource of the entity.

5. The method of claim 1, further comprising:
 determining a skill profile associated with the role,
 wherein performing the action comprises:
  determining a skill recommendation for the skill profile; and
  providing, to a management device, the skill recommendation.

6. The method of claim 1, wherein performing the action comprises at least one of:
 providing, to a management device, the task automation score and the automation category; or
 causing a display of a user interface to present the task automation score and the automation category.

7. The method of claim 1, wherein the task automation score is associated with a probability that the task is capable of being automated.

8. A device, comprising:
 one or more memories; and
 one or more processors communicatively coupled to the one or more memories, configured to:
  process, using a machine learning model, entity role data to identify a task associated with a role of an entity,
   wherein the entity role data is specific to the entity;
  determine, using the machine learning model, a task automation score associated with the task,
   wherein the task automation score is associated with a probability that the task is capable of being automated;
  determine, using the machine learning model, a set of automation category scores for the task,
   wherein the machine learning model is trained based on standardized data that is associated with standardized role descriptions of standardized roles, standardized task descriptions of standardized tasks, and standardized automation category descriptions of standardized automation-capable tasks;
  classify, based on the set of automation category scores, the task as being associated with an automation category of a plurality of automation categories that are associated with the standardized automation-capable tasks; and
  perform an action associated with the task automation score and the automation category.

9. The device of claim 8, wherein the machine learning model comprises a plurality of models that are independently trained based on the standardized role descriptions, the standardized task descriptions, and the standardized automation category descriptions.

10. The device of claim 8, wherein the one or more processors are further configured to:
 determine that the task automation score satisfies a threshold that indicates that the task is an automation-capable task that is associated with the automation category,
 wherein the one or more processors, when performing the action, are configured to:

provide a notification that the task is an automation-capable task that is associated with the automation category.

11. The device of claim 10, wherein the one or more processors are further configured to:
determine that the task automation score is one of a set of task automation scores that are associated with a plurality of tasks of the role and that satisfy the threshold, wherein the one or more processors, when performing the action, are configured to:
determine, based on a quantity of the set of task automation scores and a quantity of the plurality of tasks, a probability that the role is automatable; and
provide, to a management device, the probability that the role is automatable in association with the set of task automation scores.

12. The device of claim 8, wherein the one or more processors are further configured to:
determine that the task automation score satisfies a threshold that indicates that the task is an automation-capable task that is associated with the automation category;
obtain, based on the task automation score satisfying the threshold, entity resource information associated with the entity;
identify, from the entity resource information, a plurality of workforce types that are available to the entity to perform the task;
determine, based on the entity resource information and an entity-specific task description of the task, probabilities that the plurality of workforce types are configured to perform the task; and
identify, based on the probabilities, that a first workforce type, of the plurality of workforce types, is likely configured to perform the task,
wherein the one or more processors, when performing the action, are configured to:
perform a cost-benefit analysis of performing the task using the first workforce type or a second workforce type that is associated with the automation-capable task.

13. The device of claim 8, wherein the one or more processors are further configured to:
determine a skill profile associated with the role,
wherein the one or more processors, when performing the action, are configured to:
determine a skill recommendation for the skill profile; and
provide, to a management device, the skill recommendation to cause an adjustment associated with performance of the task.

14. The device of claim 8, wherein the one or more processors, when performing the action, are configured to at least one of:
provide, to a management device, the task automation score and the automation category; or
cause a display of a user interface to present the task automation score and the automation category.

15. A non-transitory computer-readable medium storing instructions, the instructions comprising:
one or more instructions that, when executed by one or more processors, cause the one or more processors to:
receive entity data that is associated with a role of an entity;
process, using an automation category prediction model, the entity data to determine task automation information that is associated with tasks of the role,
wherein the automation category prediction model is configured to determine the task automation information based on an entity-specific task description of the role in the entity data, standardized role descriptions that are associated with standardized roles, and standardized task automation descriptions that are associated with standardized automation-capable tasks;
process, using an adaptive workforce model, the entity data to determine adaptive workforce information that is associated with resources of the entity,
wherein the adaptive workforce model is configured to determine the adaptive workforce information based on entity resource information in the entity data, the task automation information, and standardized workforce descriptions associated with standardized workforce types;
process, using a skills analysis model, the entity data to determine a skills recommendation associated with the role,
wherein the skills analysis model is configured to determine the skills recommendation based on standardized skill descriptions associated with the standardized role descriptions; and
perform an action associated with the task automation information, the adaptive workforce information, or the skills recommendation.

16. The non-transitory computer-readable medium of claim 15, wherein the task automation information identifies at least one of:
probabilities that the tasks are automation-capable tasks,
a probability that the role can be automated, or
automation categories associated with the tasks,
wherein the one or more instructions, that cause the one or more processors to perform the action, cause the one or more processors to:
provide the task automation information to a management device.

17. The non-transitory computer-readable medium of claim 15, wherein the adaptive workforce information identifies at least one of:
probabilities that the tasks are being performed by one of the standardized workforce types, or
a cost/benefit outcome associated with adapting one or more of the tasks to be automated or performed by an external party,
wherein the one or more instructions, that cause the one or more processors to perform the action, cause the one or more processors to:
provide the adaptive workforce information to a management device.

18. The non-transitory computer-readable medium of claim 15, wherein the skills recommendation identifies at least one of:
a recommendation that a skill set should be adapted,
a recommendation that a skill set should be adjusted, or
a recommendation that a skill set should be performed by another role that is different than the role,
wherein the one or more instructions, that cause the one or more processors to perform the action, cause the one or more processors to:
provide the skills recommendation to a management device.

19. The non-transitory computer-readable medium of claim 15, wherein the automation category prediction model, the adaptive workforce model, and the skills analysis model are associated with a same type of model and are trained based on different sets of standardized data.

20. The non-transitory computer-readable medium of claim 15, wherein the one or more instructions, that cause the one or more processors to perform the action, cause the one or more processors to:
provide, to a management device, the task automation information, the adaptive workforce information, and the skills recommendation; or
cause a display of a user interface to present the task automation information, the adaptive workforce information, and the skills recommendation.

\* \* \* \* \*